(12) United States Patent
Mayer et al.

(10) Patent No.: US 11,371,951 B2
(45) Date of Patent: Jun. 28, 2022

(54) GAS SENSOR COMPRISING A SET OF ONE OR MORE SENSOR CELLS

(71) Applicant: Sensirion AG, Stafa (CH)

(72) Inventors: Felix Mayer, Stafa (CH); Markus Graf, Zurich (CH); Lukas Burgi, Zurich (CH); Martina Hitzbleck, Ruschlikon (CH); Ulrich Muecke, Zurich (CH)

(73) Assignee: Sensirion AG, Stafa (CH)

(*) Notice: Subject to any disclaimer, the term of this patent is extended or adjusted under 35 U.S.C. 154(b) by 0 days.

(21) Appl. No.: 14/293,436

(22) Filed: Jun. 2, 2014

(65) Prior Publication Data

US 2014/0264642 A1 Sep. 18, 2014

Related U.S. Application Data

(63) Continuation-in-part of application No. 13/628,719, filed on Sep. 27, 2012, now Pat. No. 8,802,568.

(51) Int. Cl.
*H01L 27/14* (2006.01)
*H01L 29/82* (2006.01)
*H01L 29/84* (2006.01)
*G01N 27/12* (2006.01)

(52) U.S. Cl.
CPC .......... *G01N 27/122* (2013.01); *G01N 27/128* (2013.01)

(58) Field of Classification Search
CPC ......... H01L 27/14609; H01L 27/14643; H01L 27/14679; H01L 31/1126; H01L 27/14689; H01L 27/14881; H01L 27/1463; H01L 41/00; G01N 27/122; G01N 27/4141; G01N 27/128

USPC .......... 257/414, 226, 233, 258, 290
See application file for complete search history.

(56) References Cited

U.S. PATENT DOCUMENTS

| | | | |
|---|---|---|---|
| 5,345,213 A | 9/1994 | Semancik et al. | |
| 5,510,013 A | 4/1996 | Hippe et al. | |
| 5,891,398 A | 4/1999 | Lewis et al. | |
| 5,907,765 A | 5/1999 | Lescouzeres et al. | |
| 6,051,854 A * | 4/2000 | Vigna ............. | G01N 27/12 204/424 |
| 6,103,033 A | 8/2000 | Say et al. | |

(Continued)

FOREIGN PATENT DOCUMENTS

| | | |
|---|---|---|
| CN | 101363810 | 2/2009 |
| CN | 101549858 | 10/2009 |

(Continued)

OTHER PUBLICATIONS

A. Hierlemann, "CMOS-based Chemical Sensors," Advanced Micro and Nanosystems, vol. 2, CMOS-MEMS, 335-390.

(Continued)

*Primary Examiner* — Jami Valentine Miller
*Assistant Examiner* — Dilinh P Nguyen
(74) *Attorney, Agent, or Firm* — Paul Teng (57) ABSTRACT

A gas sensor comprises a set of one or more sensor cells (SC) and a substrate (1). Each sensor cell (SC) of the set comprises a sensitive film (42) built from a sensitive material (4) covering an area of the substrate (1). One or more elevated structures (2) are manufactured in or around said area for preventing the sensitive material (4) to expand when being applied thereto.

22 Claims, 5 Drawing Sheets

(56) References Cited

U.S. PATENT DOCUMENTS

| | | | |
|---|---|---|---|
| 6,325,797 | B1 | 12/2001 | Stewart et al. |
| 6,325,979 | B1 | 12/2001 | Hahn et al. |
| 6,662,439 | B1 | 12/2003 | Bhullar |
| 6,753,144 | B1 | 6/2004 | Hirota et al. |
| 6,767,396 | B2 | 9/2004 | McElligott et al. |
| 6,939,451 | B2 | 9/2005 | Zhao et al. |
| 7,061,061 | B2 | 6/2006 | Goodman et al. |
| 7,096,716 | B2 | 8/2006 | Theil |
| 7,115,354 | B2 | 10/2006 | Hatakeyama et al. |
| 7,225,535 | B2 | 6/2007 | Feldman et al. |
| 7,442,502 | B2 | 10/2008 | Hirota et al. |
| 7,495,300 | B2 | 2/2009 | Gardner et al. |
| 7,721,412 | B2 | 5/2010 | Say et al. |
| 7,727,775 | B2* | 6/2010 | Willson ........... G01N 33/54373 436/518 |
| 7,771,620 | B2 | 8/2010 | Chung et al. |
| 7,797,814 | B2 | 9/2010 | Say et al. |
| 7,820,970 | B1* | 10/2010 | Shaw ................ G01J 5/08 250/338.1 |
| 7,824,539 | B2 | 11/2010 | Zhou et al. |
| 7,911,010 | B2 | 3/2011 | Stetter |
| 2002/0154029 | A1* | 10/2002 | Watters ............... G01D 5/48 340/870.07 |
| 2004/0023253 | A1 | 2/2004 | Kunwar et al. |
| 2004/0163953 | A1 | 8/2004 | Bhullar |
| 2005/0051511 | A1 | 3/2005 | Ke et al. |
| 2006/0014005 | A1 | 1/2006 | Basco et al. |
| 2006/0034731 | A1 | 2/2006 | Lewis et al. |
| 2006/0055502 | A1 | 3/2006 | Usui |
| 2006/0183261 | A1 | 8/2006 | Dudenheofer et al. |
| 2006/0272942 | A1 | 12/2006 | Sirringhaus |
| 2007/0041878 | A1 | 2/2007 | Bryning et al. |
| 2007/0095662 | A1 | 5/2007 | Suzuki |
| 2008/0035478 | A1 | 2/2008 | Wegner et al. |
| 2008/0087542 | A1 | 4/2008 | Moore et al. |
| 2008/0217173 | A1 | 9/2008 | Varney et al. |
| 2009/0153942 | A1* | 6/2009 | Daniel .................. G02F 1/167 359/296 |
| 2009/0211639 | A1 | 8/2009 | Park et al. |
| 2009/0242405 | A1 | 10/2009 | Mayer et al. |
| 2009/0249621 | A1 | 10/2009 | Rochat et al. |
| 2010/0021659 | A1 | 1/2010 | Feldman et al. |
| 2010/0035245 | A1 | 2/2010 | Stiene et al. |
| 2010/0055729 | A1 | 3/2010 | Ahn |
| 2010/0060465 | A1 | 3/2010 | Stetter |
| 2010/0132788 | A1 | 6/2010 | Petrat et al. |
| 2010/0140673 | A1 | 6/2010 | Daniel et al. |
| 2010/0143675 | A1 | 6/2010 | Guckian et al. |
| 2010/0170793 | A1 | 7/2010 | Feldman et al. |
| 2011/0042211 | A1 | 2/2011 | Huang et al. |
| 2011/0171363 | A1 | 7/2011 | Komatsu et al. |
| 2011/0174799 | A1 | 7/2011 | Ali et al. |
| 2011/0233472 | A1 | 9/2011 | Hotz et al. |
| 2012/0050038 | A1 | 3/2012 | Stetter |
| 2012/0138871 | A1 | 6/2012 | Dorfman et al. |
| 2013/0183660 | A1 | 7/2013 | Yu et al. |
| 2014/0084390 | A1 | 3/2014 | Mayer et al. |
| 2014/0235493 | A1 | 8/2014 | Zang et al. |
| 2014/0308770 | A1 | 10/2014 | Mayer et al. |

FOREIGN PATENT DOCUMENTS

| | | |
|---|---|---|
| DE | 19642453 | 10/1996 |
| DE | 19642453 | 7/1998 |
| DE | 10119405 | 4/2001 |
| DE | 10200504055 | 3/2006 |
| DE | 102005040055 | 3/2006 |
| DE | 102006019534 | 11/2007 |
| DE | 102008064331 | 12/2008 |
| DE | 102009031773 | 6/2009 |
| DE | 102010017844 | 4/2010 |
| EP | 1308705 | 5/2007 |
| EP | 1933138 | 6/2008 |
| EP | 2713157 | 4/2014 |
| GB | 2464016 | 7/2010 |
| JP | 2004205294 | 7/2004 |
| JP | 2011033592 | 2/2011 |
| KR | 100843169 | 7/2008 |
| KR | 100845717 | 7/2008 |
| KR | 20110098423 | 9/2011 |
| WO | 9953287 | 10/1999 |
| WO | 2007124725 | 11/2007 |
| WO | 2008126897 | 10/2008 |
| WO | 200812689700 | 10/2008 |
| WO | 2012003348 | 1/2012 |
| WO | 2013095730 | 6/2013 |
| WO | 2014007603 | 1/2014 |

OTHER PUBLICATIONS

Applied Sensor, "Metal Oxide Semiconductor (MOS) Sensors", www.appliedsensors.com, 2 pages.

Nanoparticle Dispersions & Suspensions, "Dispersions, Suspensions & Inks", Oct. 23, 2012, 1 page.

Ralph Eichler, "President's Selection, ETHZ, Nanotropfchenweise and the Translations Article", "Nano Drop by Drop", Nov. 2011, 3 pages.

J. Puigcorbe et al., "High Temperature Degradation of Pt/Ti Electrodes in Micro-Hotplate Gas Sensors", Institute of Physics Publishing, 13 (2003), S119-S124.

I. Simon et al., "Micromachined Metal Oxide Gas Sensors: Opportunities to Improve Sensor Performance," Science B. V., Sensors and Acuators, B 73 (2001), 1-26.

Martin Heule et al., "Miniaturised Arrays of Tin Oxide Gas Sensors on Single Microhotplate Substrates Fabricated by Micromolding in Capillaries", Elsevier Science B.V., Sensors and Acuators B 93 (2003), 100-106.

A. Friedberger et al., "Micromechanical Fabrication of Robust Low-Power Metal Oxide Gas Sensors," Sensors and Acuators B 93 (2003), 345-349.

Markus Graf et al., "CMOS Monolithic Metal-Oxide Sensor System Comprising a Microhotplate and Associated Circuitry", IEEE Sensors Journal, vol. 4, No. 1, Feb. 2004, pp. 9-16.

Hey-Jin Lim et al., "Gas Sensing Properties of ZnO Thin Films Prepared by Microcontact Printing", Sensors and Actuators A 125, 2006, pp. 405-410.

B. Ruhland et al., "Gas-Kinetic Interactions of Nitrous Oxides with SnO2, Surfaces", Sensors and Actuators B 50, 1998, pp. 85-94.

Wenfeng SHEN, "Properties of SnO2 Based Gas-Sensing Thin Films Prepared by Ink-Jet Printing", Sensors and Actuators B 166-167, 2012, pp. 110-116.

European Search Report No. 13004568.5, completed on Jan. 27, 2014.

European Search Report No. in Application No. 14001902.7 dated Aug. 1, 2014, completed on Jul. 25, 2014.

Hey-Jin Lim et al., "Gas Sensing of ZnO Thin Films Prepared by Microcontact Printing", Sensors and Actuators, A, vol. 125, 2006, pp. 405-410.

Chinese Office Action for Application No. 201310447275.5, dated Feb. 24, 2017.

European Office Action for Application No. 13004568.5 dated Jul. 10, 2018.

* cited by examiner

GAS SENSOR COMPRISING A SET OF ONE OR MORE SENSOR CELLS

CROSS REFERENCE TO RELATED APPLICATION

This application is a continuation-in-part of U.S. patent application Ser. No. 13/628,719 filed Sep. 27, 2012, now allowed, the entire disclosure of which is incorporated herein by this reference.

TECHNICAL FIELD

The invention relates to a gas sensor and to a method for manufacturing a gas sensor.

BACKGROUND ART

A gas sensor performs a detection of chemical substances or compounds which are also denoted as analytes contained in a gas, or possibly in a fluid, supplied to the gas sensor. In case multiple different analytes shall be detected by a gas sensor, the gas sensor may comprise multiple sensor cells with each sensor cell being designed for detecting one or more of the subject analytes.

DISCLOSURE OF THE INVENTION

According to a first aspect of the present invention, a gas sensor is provided with a set of one or more sensor cells. A sensor cell may be understood as an entity of the gas sensor which may be read individually. Each sensor cell of the set comprises a sensitive film built from a sensitive material covering an area of the substrate which area does not extend beyond a maximal admissible coverage area for the sensor cell that may be defined upfront. When bringing the sensitive material onto the substrate, it is desired that the sensitive material does not extend outside such maximal admissible coverage area designated for the sensitive film. For this purpose, it is envisaged to provide one or more elevated structures in said maximal admissible coverage area for preventing the sensitive material to expand therefrom when being applied thereto. It is noted that the one or more elevated structures are arranged in maximal admissible coverage area, i.e. their footprint is within maximal admissible coverage area. For this reason a top surface of the one or more elevated structures is likely to be covered by the sensitive material. Subject to the view, an elevated structure shall also include an indentation, for example an indentation in a layer of the substrate. In one example, an elevated structure may rather be perceived as an elevation in case the sensitive material is deposited to a level of the substrate from which the expansion inhibitors protrude. In another example, the elevated structure may rather be perceived as indentation in case the sensitive material is deposited to a level of the substrate that coincides with the top level of the elevations.

It is intended that an expansion of the sensitive material at least stops at the outmost elevated structure/s, and specifically at a falling edge thereof owed to surface tension effects in the sensitive material when covering the top surface thereof. Specifically, such outmost elevated structure comprises a first side face facing the sensitive material when expanding. A second side face is averted from the first side face and therefore does not face the expanding sensitive material. The first side face may finally be covered by the sensitive material as may be the top surface of this outmost elevated structure. However, owed to surface tension the second side face may not be covered and the expansion of the sensitive material can be stopped at the falling edge.

In a very preferred embodiment, the, or a number of, or all of the elevated structures are made from an insulating coating of the substrate, and specifically are made from one of silicon nitride and silicon oxide. Given that the substrate is defined as also encompassing layers of material,—such as CMOS layers, if any—deposited onto a bulk substrate material, the at least one elevated structure can be manufactured by standard CMOS processes such as lithography and etching. In a preferred embodiment, a top insulating layer of the substrate, such as a passivation layer in form of a silicon nitride layer may be used for manufacturing the at least one elevated structure. A recess may be etched into the insulating layer. Any elevated structures to be generated are exempted from etching and remain as structures protruding from the recess. Preferably, the recess is dimensioned to exceed the maximal admissible coverage area the sensitive film shall finally cover at maximum such that after having fabricated the sensitive film, at least a trench remains between the sensitive film and a rim of the insulating layer defining the recess.

The area covered by the sensitive film may in some examples be less than the maximal admissible coverage area in case any of the inner elevated structures may already cause the expansion of the sensitive material to stop. In such case, other elevated structures may remain uncovered by the sensitive material and may remain standing free between the sensitive film and the rim.

In a different embodiment, an electrically conducting layer of the substrate may be used for manufacturing one or more elevated structures from. Such layer may be a metal layer, for example made from one of gold, platinum and aluminum. This elevated structure may at the same time serve as electrode for electrically contacting the sensitive film. Hence, in this embodiment, the elevated structure/s are connected to an electrical contact where a voltage or a current can be applied to for reading the sensor cell. In a different embodiment, the conducting property of the elevated structure is not utilized, and the elevated structure/s are disconnected from any voltage or current source. The structures may remain at floating potential and do not serve for any other purpose than inhibiting expansion of the sensitive material. In a different embodiment, an elevated structure may only be covered by an electrically conducting material while a core of the elevated structure is of non-conducting property.

In a different embodiment, elevated structures of different material may be mixed within the maximal admissible coverage area assigned to a sensor cell. For example, an inner portion thereof comprises one or more elevated structures made from or covered by an electrically conducting material, while an outer portion of the area surrounding the inner portion comprises one or more elevated structures made from an insulating coating.

In another embodiment, a portion of the one or more elevated structures is arranged outside a region that is covered by an electrode pattern for measuring a property of the sensitive film. Hence, the area of the sensitive film does not necessarily match with the region the electrodes cover. For example, the electrode pattern may be arranged within a square while the maximal admissible coverage area is defined as a circle, e.g. extending outside the square region defined by the electrodes. As a result, a portion or a number of one or more elevated structures is arranged outside this region. The electrode pattern may reside underneath the elevated structure/s, or may at the same time serve as elevated structures as described above.

In a preferred embodiment, each sensor cell of the set comprises more than two elevated structures, and preferably three, four, or five, or any other number between three and ten. An elevated structure in this context is considered as an elevation not linked to another elevation. Each elevated structure may preferably take the form of a closed ring, such as the circumference of a circle or the circumference of a rectangle, with the ring structures having different radii or diameters and being arranged within each other. Provided the sensitive material is introduced to a centre of the maximal admissible coverage area, the material tends to expand radially from this centre. When having arranged such repeating ring structures, the sensitive material first has to overcome the first ring, then the second ring, and so on, until it at least stops at the outmost ring owed to the surface tension effect. However, the material may stop at any inner ring, be it its rising or its falling edge, and then only cover an area that is smaller than the maximal admissible coverage area.

In another embodiment, a set of elevated structures is provided with more than ten, and especially more than fifty elevated structures. Preferably, a footprint of each elevated structure of the set is less than 35 µm×35 µm, and in particular is less than 5 µm×5 µm, and in particular is less than 1 µm×1 µm. A height of such elevated structure may be equal to or more than 0.5 µm, and in particular may be between 0.5 and 5 µm, and in particular is less than 35 µm. The elevated structures of the set may take the shape of an uprising member with a footprint significantly smaller—e.g. more than a hundred times smaller—than the area of the sensitive film. Those uprising members may take different 3D shapes subject to the geometry of their footprint. The footprint of an individual elevated structure may be of one of: an oval, a circle, a rectangle, a square, a triangle. The 3D shape of a corresponding elevated structures may be one of a pillar, a post, a prism. These elevated structures may be manufactured from SiN, for example, or from a photoresist, such as SU8, or from a dry film resist, such as TMMF. Any of the elevated structures addressed may be manufactured from one of these materials.

In a preferred embodiment, the elevated structures comprise a set of elevated structures such as described in the previous paragraph, and in addition one or more elevated ring structures, e.g. encircling the set of elevated structures.

It was noticed that the more elevated structures are arranged in a direction of the expansion of the sensitive material, the more energy is required for the sensitive material to expand. This is owed to an increase of a surface to be wet by the material invoked by the number of structures. As a result, in such embodiments higher contact angles can be achieved wherein a contact angle is defined as angle at which the sensitive film meets a top surface of an elevated structure. A high contact angle is desired, for localizing sufficiently large volumes on the sensor, for example ~100 pL in an area of ~70 um diameter.

In a preferred embodiment of the gas sensor, the area covered by the sensitive film is dimensioned at less than 100 µm times 100 µm. It is preferred that this area is a circle, especially when its ohmic resistance is measured for detecting analytes. Preferably, the sensitive film is arranged on a hotplate of the substrate, i.e. a region in which the substrate is thinned compared to other regions of the substrate. In a preferred embodiment, the sensitive material includes nanoparticles in a suspension or solution, for example metal oxide nano-particles, which is dispensed to the substrate and may also be referred to as ink. The solution or suspension may evaporate after deposition and the remainder of the sensitive material contributes to the sensitive film. Preferably, the gas sensor is a chemoresistive sensor containing a metal-oxide semiconductor material applied to a substrate and building a sensitive film therefrom. In another preferred embodiment, the sensitive material includes polymer material, especially a soluble polymer material, such as polyimide, polythiophene, polyurethane, or polyaniline.

According to another aspect of the invention, a method is provided for manufacturing a gas sensor with at least one sensor cell. A substrate is provided including a maximal admissible coverage area to build the sensor cell on. At least one elevated structure is manufactured in said maximal admissible coverage area for preventing a sensitive material to expand therefrom when being applied thereto. A sensitive film of the sensor cell is then built by contactless dispensing the sensitive material to said maximal admissible coverage area. During and after dispensing, the sensitive material extends and is prevented from expanding from said maximal admissible coverage area by the at least one elevated structure.

Other advantageous embodiments are listed in the dependent claims as well as in the description below.

The described embodiments similarly pertain to the sensor and the method. Synergetic effects may arise from different combinations of the embodiments although they might not be described in detail.

BRIEF DESCRIPTION OF THE DRAWINGS

The embodiments defined above and further aspects, features and advantages of the present invention can also be derived from the examples of embodiments to be described hereinafter and are explained with reference to the drawings. In the drawings it is illustrated in.

MODES FOR CARRYING OUT THE INVENTION

A gas sensor may in one embodiment of the present invention comprise at least one sensitive film made from material being sensitive to one or more analytes. The number of sensitive films arranged separate from each other on a common substrate may define the number of sensor cells of a gas sensor. The gas sensor preferably is embodied as a sensor array comprising a set of two or more sensor cells, e.g. four sensor cells, wherein each sensor cell may include a sensitive film. A sensor cell may be understood as an entity of the gas sensor which may be read individually. Preferably, in the embodiment of the sensor array, each or at least some of the sensitive films are sensitive to different analytes. These sensitive films may accordingly be built from sensitive material of different composition. The corresponding sensitive films may exhibit different sensitivities from cell to cell such that each cell of the sensor array may be mainly sensitive to a specific analyte and as such may allow detecting the presence or absence or concentration of such analyte. "Mainly" in this context shall mean, that a sensor cell is more sensitive to the subject analyte than to other analytes. Preferably, in such array of sensor cells the sensitive films do not touch each other. The gas sensor performs a detection of chemical substances or compounds—collectively denoted as analytes—contained in a gas, or possibly in a fluid supplied to the gas sensor. Such analytes may include one or more of, for example, CO2, NOX, ethanol, CO, ozone, ammonia, formaldehyde, or xylene without limitation.

The gas sensor may comprise a sensitive material, e.g. in form of a film, the analyte may interact with. As a result, an electrical property of the sensor material may be modified upon interaction such as its electrical conductance, which principle preferably is applied in metal oxide gas sensors, for example. Then, the electrical property of a combination of the analyte and the sensor material is measured and allows a conclusion as to the analyte, such as by way of comparison to a property of the sensor material measured without the presence of the analyte. Specifically, the sensitive film/s may contain a metal oxide material, and in particular a semiconducting metal oxide material, and specifically may contain metal oxide materials of different composition per sensitive film. Such metal oxide material generally may include one or more of tin oxide, zinc oxide, titanium oxide, tungsten oxide, indium oxide and gallium oxide. Such metal oxides may be used for the detection of analytes such as VOCs, carbon monoxide, nitrogen dioxide, methane, ammonia or hydrogen sulphide. Metal oxide sensors are based on the concept that gaseous analytes interact with the metal oxide layer at elevated temperatures of the sensitive layer in the range of more than 100° Celsius, and specifically between 250° C. and 350° Celsius. As a result of the catalytic reaction, the conductivity of the sensitive film may change which change can be measured. Hence, such gas sensors are also denoted as high temperature chemoresistors for the reason that a chemical property of the analyte is converted into an electrical resistance at high temperatures of the sensitive film. In a metal oxide gas sensor with multiple sensor cells, all sensitive films may be heated by a common heater, or each sensitive film may be heated by an individual heater.

Preferably, by means of such gas sensor a gas may be investigated at least as to the absence or presence of the subject analytes the gas sensor is sensitive to. Hence, the gas supplied to the gas sensor may be analyzed by means of the gas sensor as to if and which of the chemical substances or compounds the gas sensor is sensitive to are present in the gas supplied. A combination of analytes detected in the gas supplied may suggest for a certain odour or for a certain gas. It is always subject to a design of the gas sensor as to how many different analytes and/or how many different properties of an analyte the gas sensor is sensitive to. It is noted that for the different analytes the gas sensor is sensitive to it is not required to always measure the same property per analyte. Different properties may be measured for different analytes.

In the context of the present invention, a substrate shall include any platform for dispensing a suspension or solution of sensitive material to. The substrate may be one of a semiconductor, a glass or a ceramic substrate, or a polymer substrate, in particular a flexible polymer substrate, for example. However, the substrate may also include one or more layers deposited on a semiconductor substrate, for example, CMOS layers, on which layers the sensitive film finally is arranged. A certain area of the substrate that is also referred to as maximal admissible coverage area is designated to accept the sensitive material for finally forming a sensitive film. In view of the miniaturization of sensor chips, it is desired to minimize the area on/of the substrate covered by the sensitive material. In case of multiple sensor cells the sensitive films of these multiple sensor cells are desired to be arranged close to each other in view of space saving considerations. The area that shall be maximal allowed for building the sensitive film on may be defined upfront. It is preferred that the/these maximal admissible coverage areas are confined in order to save space on the substrate. Hence, it is preferred to provide an expansion inhibitor in form of at least one elevated structure protruding within said maximal admissible coverage area which elevated structure prevents sensitive material to be dispensed to escape from this maximal admissible coverage area, or in other words, to expand or to spill over from this maximal admissible coverage area.

When the sensitive material is dispensed to the assigned area, it is preferably dispensed in a contactless way. This means that there is no contact between a dispenser of the sensitive material and the substrate. Hence, a gap between the dispenser and the substrate has to be overcome by the sensitive material. In contrast, contact printing would be understood as pressing the dispenser against the substrate, such that for example a stamp covered by ink acting as dispenser is brought into contact with the substrate for transferring the ink to the substrate. There is no gap to be overcome by the ink in contact printing. For implementing a contactless dispensing, it is preferred to provide the sensitive material as a liquid, e.g. in a container, and dispense the sensitive material in liquid form to the substrate on the designated areas. Contactless dispensing may preferably include jet dispensing wherein a continuous jet of liquid or discrete jet of liquid—e.g. in form of individual drops—is applied under pressure, e.g. by using a tight nozzle, to the substrate. Hence, jet printing may include an acceleration of the liquid in the dispenser to form a jet.

Hence, the dispensing approach may result in the sensitive material meet the substrate at high impact. This may be one of the reasons, why it is desired to provide an expansion inhibitor for confining the impacting jet to the maximal admissible coverage area. However, even after having dispensed the sensitive material to the substrate the sensitive material may at least for a limited period in time be flowable on the substrate and may want to escape the maximal admissible coverage area in order to reach its state of lowest energy. This is another instance when the expansion inhibitor prevents from such undesired escape of the sensitive material. In a beneficial secondary effect, even after a solvent may be evaporated from the sensitive film, e.g. by heating the substrate, and after the sensitive material is dried, e.g. by sintering, tempering, etc., and becomes a more or less solid sensitive film, the expansion inhibitor may support fixing the sensitive film in its position.

In the context of printing the sensitive material, the sensitive material may also be denoted as ink. An ink reservoir of a print head may be filled with the suspension, and the suspension may be jet printed onto the area on the substrate for depositing the sensitive material there. Specifically, the underlying ink jet printing technology may be one of the following:

continuous ink jet printing;
thermal ink jet printing;
piezo ink jet printing.

However, in other embodiments, the contactless dispensing of sensitive material shall include one of screen printing, spraying, and jet dispensing. In one embodiment of contactless dispensing, a predefined amount of ink containing the sensitive material is applied as a single portion to the designated area for building one sensor cell. In a different embodiment, the predefined amount of ink may be split into multiple portions, e.g. between 2 and 100 portions, and may be dispensed to the designated area portion-wise for building one sensor cell. A portion may contain as less as a picolitre amount of ink.

It is preferred that all sensor cells of the set are monolithically integrated into a common sensor chip with a common substrate for all the sensor cells. Such monolithic sensor chip may be encapsulated and be arranged on and electrically connected to a conductor board. Such gas sensor chip may, due to its small size, be used in any portable electronic device such as a mobile phone, and in particular a smart phone, a handheld computer, an electronic reader, a tablet computer, a game controller, a pointing device, a photo or a video camera, or a computer peripheral, which listing is not limited, and may support the chemical and/or odour and/or gas identification as to its environment.

Figure 1:
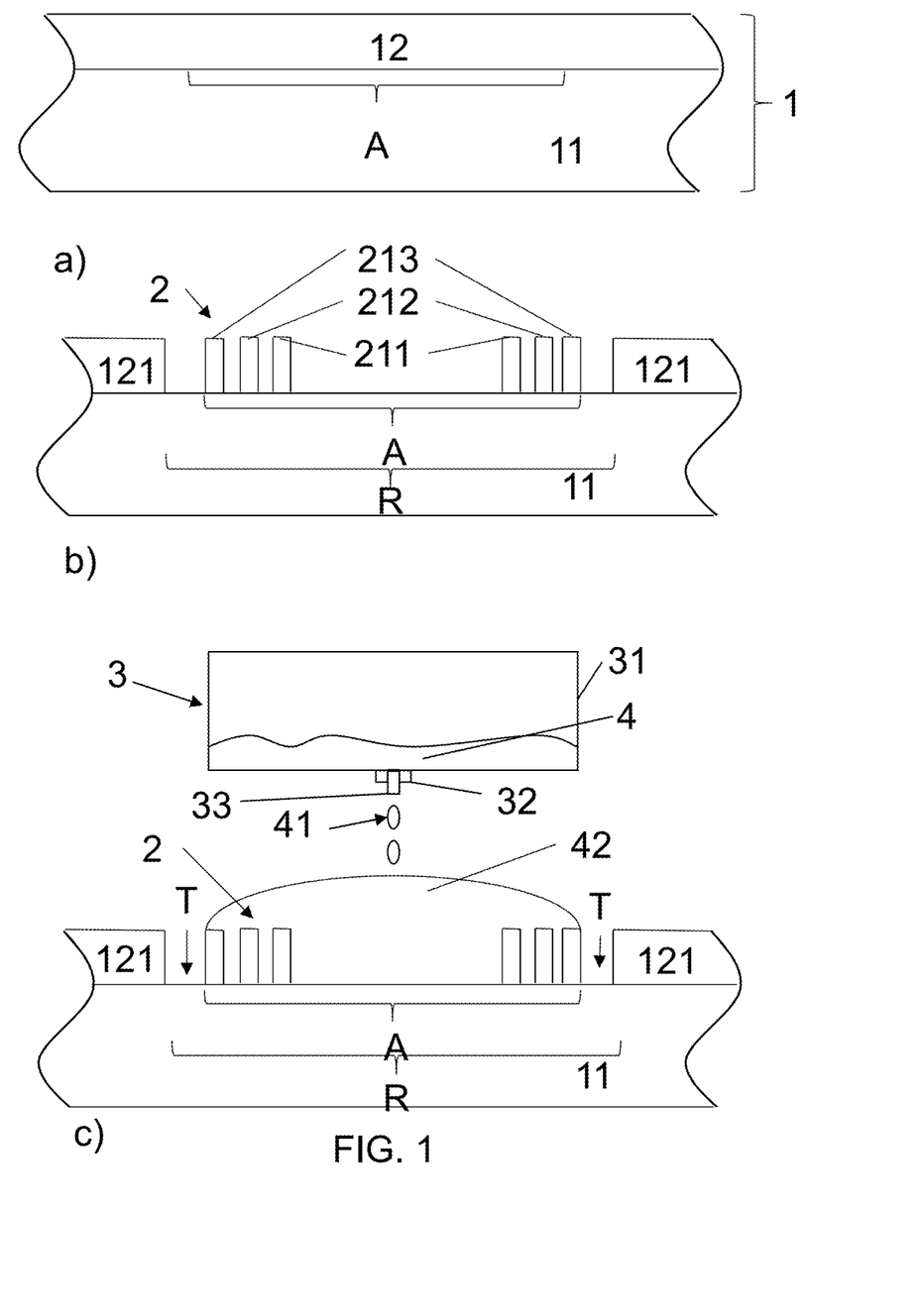
FIG. 1 a sectional view of a gas sensor according to an embodiment of the present invention, in different manufacturing steps, FIG. 2 a sectional view of a gas sensor according to another embodiment of the present invention, in different manufacturing steps, FIG. 3 a top view on elevated structures of a gas sensor according to an embodiment of the present invention, FIG. 4 and FIG. 5 each a schematic top view on elevated structures of a gas sensor according to an embodiment of the present invention, FIG. 6 a perspective view on elevated structures of a gas sensor according to an embodiment of the present invention, FIG. 7 a perspective view of an elevated structure as used in a gas sensor according to an embodiment of the present invention, FIG. 8 perspective views of different elevated structures as used in a gas sensor according to an embodiment of the present invention, FIG. 9 a top view on a gas sensor according to another embodiment of the present invention, and FIG. 10 a side cut of a gas sensor according to an embodiment of the present invention, and FIG. 11 a sectional view of a gas sensor according to another embodiment of the present invention.

FIG. 1 illustrates a sectional view of a gas sensor according to an embodiment of the present invention. According to diagram 1a), a substrate 1 is provided such as a semiconductor substrate comprising a bulk silicon 11 and an insulating coating 12 on top of the bulk silicon 11. However, there may be various other layers arranged in between the insulating coating 12 and the bulk silicon 11 which are not shown in the Figures. Specifically, all these layers including the insulating coating 12 may belong to a CMOS layer stack for integrating an electronic circuit. In a preferred embodiment, the insulating coating 12 is a SiN layer. An area A is designated as maximal admissible coverage area with respect to the substrate 1 for building a sensor cell on.

According to diagram 1b), the insulating coating 12 is structured and a recess R is etched having portions 121 of the insulating coating 12 remain as rim defining the recess R. In this embodiment, the elevated structures comprise three elevated rings 211, 212 and 213 arranged within each other.

In the next step shown in diagram 1c), a sensitive film 42 is built from a sensitive material 4 supplied by a print head 3 comprising a container 31 holding the liquid sensitive material 4. The print head 3 comprises a piezo actuator 32 arranged at a nozzle 33 of the print head 3 for forming and ejecting droplets 41 of the sensitive material 4 towards the substrate 1.

First a volume within the first ring 211 may be filled. Provided that sufficient sensitive material 4 is supplied by the print head 3, the first ring 211 may overflow and the sensitive material 4 pours into a gap between the first and the second ring 211, 212. Provided that the sensitive material is continued to be supplied from the print head 3, this gap is filled and the second ring 211 may overflow with the sensitive material 4 pouring into a gap between the second and the third ring 212, 213. The sensitive material 4 fills this gap and will spill over the third ring 213 and cover its top surface but does not pour into trench T owed to surface tension. In diagram 1c), it is suggested that multiple droplets 41 of the sensitive material 4 are supplied in sequence for building the sensitive film 42. In essence, the overall volume of sensitive material 4 is dimensioned such that its volume exceeds the volume within the first ring 42 in order to build a sensitive film 42 stopping at the falling edge of the outmost ring 213. In an alternate embodiment, a single droplet is supplied by the print head 3 in order to build the sensitive film 42 as shown. Here, the overall amount of ink is not quantized into smaller portions sequentially delivered by the print head 3, but is supplied at once. Provided that such droplet is directed towards the centre of the maximal admissible coverage area A or close by, the effect is the same in that the first ring 211 is flooded, etc., until surface tension will make the sensitive material 4 stop at the falling edge of the third ring 213.

The result of this process is a sensor cell SC as shown in diagram 1c) covering an area that coincides with the maximal admissible coverage area A. The sensor cell is separated from the rim 121 of the insulating coating 12 by trench T. Hence, the area covered by the sensor cell SC is smaller than the recess R etched into the insulating coating 12. However, in another embodiment, the sensitive material may even not make it to the third ring 213 and, e.g. stop at the falling edge of the second ring 212. In this embodiment, the area covered by the sensitive film 42 finally is smaller than the maximal admissible coverage area A.

The above teaching can, of course, be applied to different geometries of elevated structures 2, and to a different number of elevated structures 2.

Figure 2:
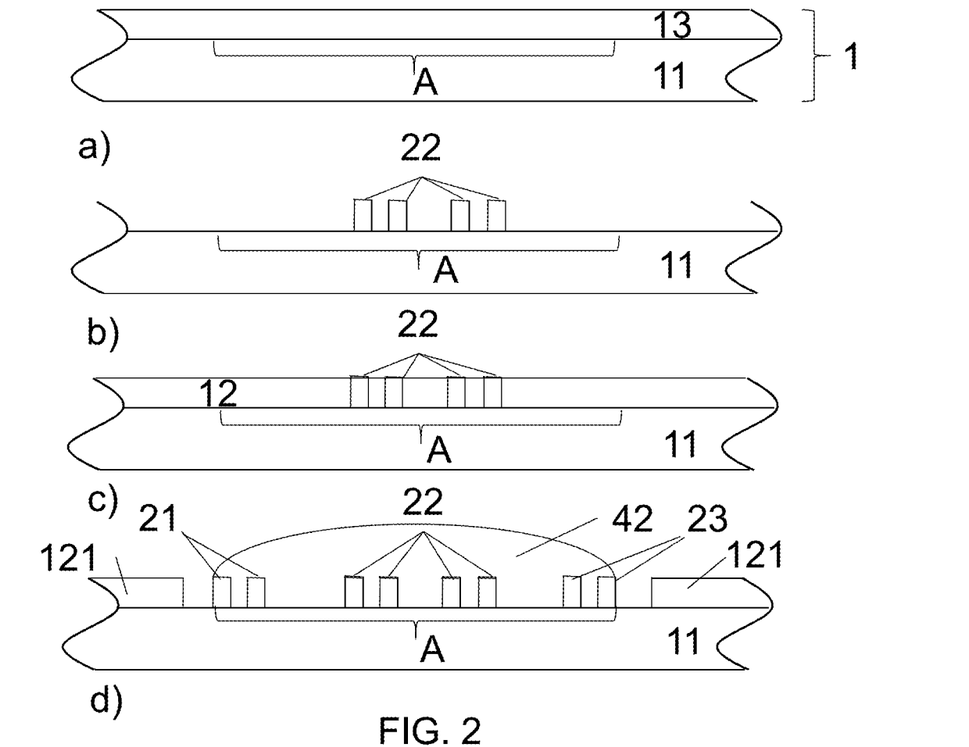

FIG. 2 illustrates a sectional view of a gas sensor according to a different embodiment of the present invention. According to diagram 2a), a substrate 1 is provided such as a semiconductor substrate comprising a bulk silicon 11. A metal layer 13 is applied to the bulk silicon 11. Again, various other layers may be arranged in between the metal layer 13 and the bulk silicon 11. Again, all these layers including the metal layer 13 may belong to a CMOS layer stack for integrating an electronic circuit therein. In a preferred embodiment, the metal layer 13 may be made from aluminium. The maximal admissible coverage area A is designated with respect to the substrate 1 for building a sensor cell on.

In the following, the metal layer 13 is structured for building electrodes 22, such as interdigital electrodes, see diagram 2b). In a next step, an insulating coating 12 is applied to the substrate 1, see diagram 2c). Additional elevated structures 21 are generated by etching the insulating coating 12. The additional elevated structures 21 may again be rings or have a different shape. As can be derived from diagram 2d), the elevated structures 22 and 21 protrude from the substrate 1 in form of electrode fingers made from metal and in form of two rings made from the insulating material. The elevated structures 21 and 22 in combination serve as expansion inhibitors for the sensitive material 4 to be applied. The resulting sensor film 42 is shown in diagram 2d). The sensitive material 4 is prevented from pouring into trench T by surface tension in combination with a granular dosage of the sensitive material 4.

Figure 3:
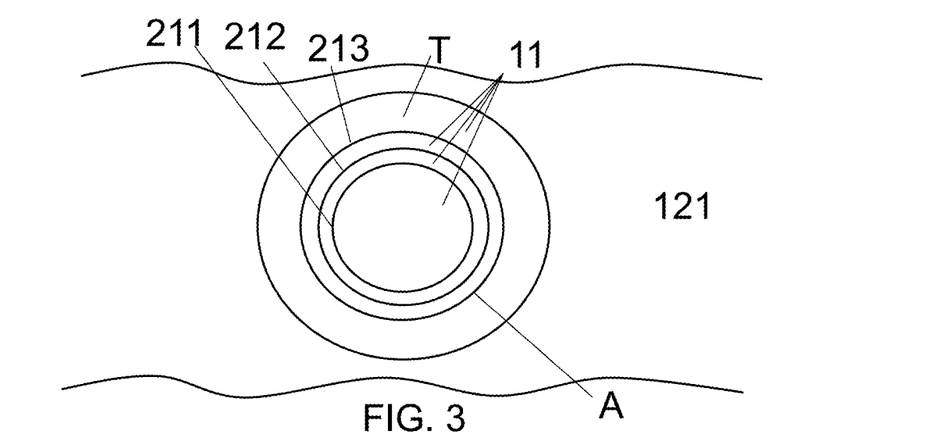

FIG. 3 shows a top view on elevated structures of a gas sensor according to an embodiment of the present invention, and preferably according to the embodiment shown in FIG.

1. The sensitive material is not applied yet to the substrate. Hence the top view may correspond to diagram 1b). In this top view, the rim 121 of the insulating coating is separated from the outmost ring 213 by trench T. Each ring 211, 212, 213 is referred to as a line only, such that between two lines representing rings the bulk silicon 11 or any other material underneath the insulating coating may be seen in top view.

Figure 4:
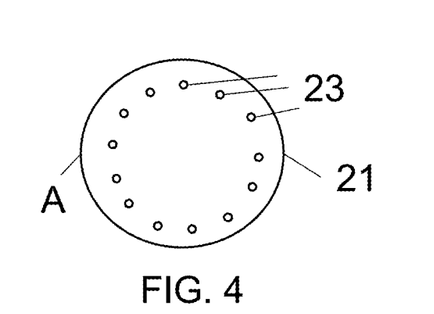

FIG. 4 shows a schematic top view on elevated structures of a gas sensor according to an embodiment of the present invention. The elevated structures comprise a ring 21, and a set of multiple individual small-size elevated structures 23 denoted by the small circles. The set of small size elevated structures may be regarded as protruding members. Each elevated structure of the set supports limiting an expansion of the sensitive material given that surface tensions are invoked.

Figure 5:
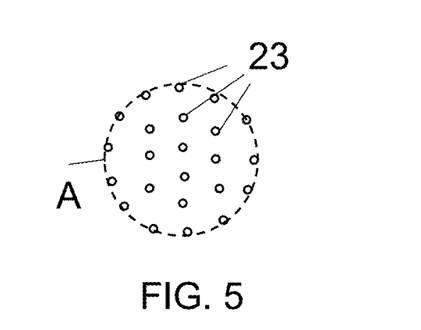

In contrast to the embodiment of FIG. 4, the embodiment of FIG. 5 no longer comprises an elevated ring, but solely provides the set of multiple small-size elevated structures which in combination act as expansion inhibitor. The maximal admissible coverage area A for the sensor cell is defined by the outer ring of elevated structures of the set.

Figures 6, 7:
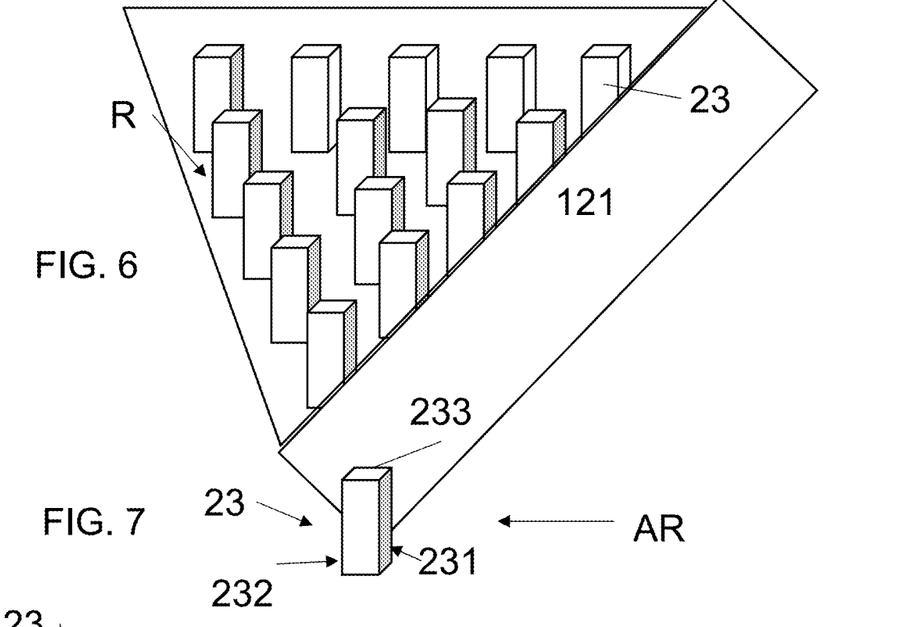

FIG. 6 shows a perspective view on a set of elevated structures in form of posts 23. The posts 23 are arranged within a recess R of an insulating coating. Hence, the posts 23 are made from the insulating coating material as well. The recess R is of triangle shape but may be of any other geometry. The ink may be supplied to the centre of the triangle. Again the ink shall stop at least at outer posts 23 thereby leaving a trench uncovered by sensitive material between the outmost row of posts 23 and the rim 121.

From the FIGS. 1 and 6 it becomes apparent, that the elevated structures for multiple sensor cells on the same substrate can be manufactured in a single structuring and etching step without the need to apply any additive processes. The sensitive films of various sensor cells may be arranged in recesses in the insulating layer next to each other. The various sensor cells are separated from each other by the rims defining the recesses.

FIG. 7 shows a perspective view of an individual elevated structure such as a post 23 as may be used in the embodiment of FIG. 6. The post 23 has a first side face 213 facing the ink when being exposed thereto under the assumption that the ink is applied to a location right to the first side face 231 and expanding in direction of arrow AR. A second side face 232 of the post 23 is averted from the first side face 231. A top surface 233 links the first and the second side face 231 and 232. It is assumed that the ink covers the first side face 231 and floods its top surface 233. However, it is preferred that the ink stops expanding on the top surface 233 owed to surface tension and as a result does not pour down the second side face 232 which will be kept free from the ink.

Figure 8:
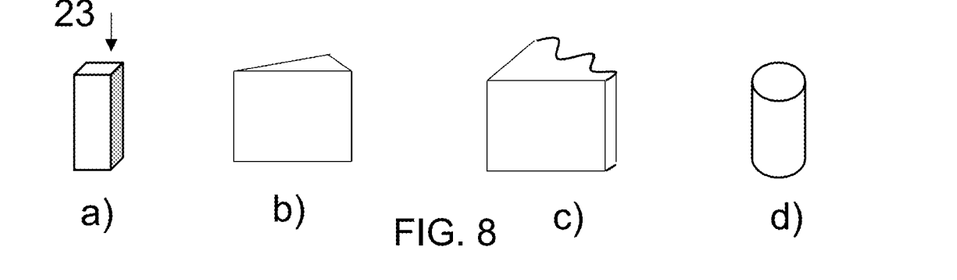

FIG. 8 shows perspective views of different elevated structures as may be used in a set of elevated structures according to an embodiment of the present invention. Diagram 8a) shows a post with a square base area, diagram 8b) a prism having a triangle base area, diagram 8c) a crown like structure, and diagram 8d) a pillar with a circle base area. In a preferred embodiment, a set of elevated structures as shown in diagram 8c) is provided as outmost elevated structures confining the area, preferably with the tips facing outwards.

Figure 9:
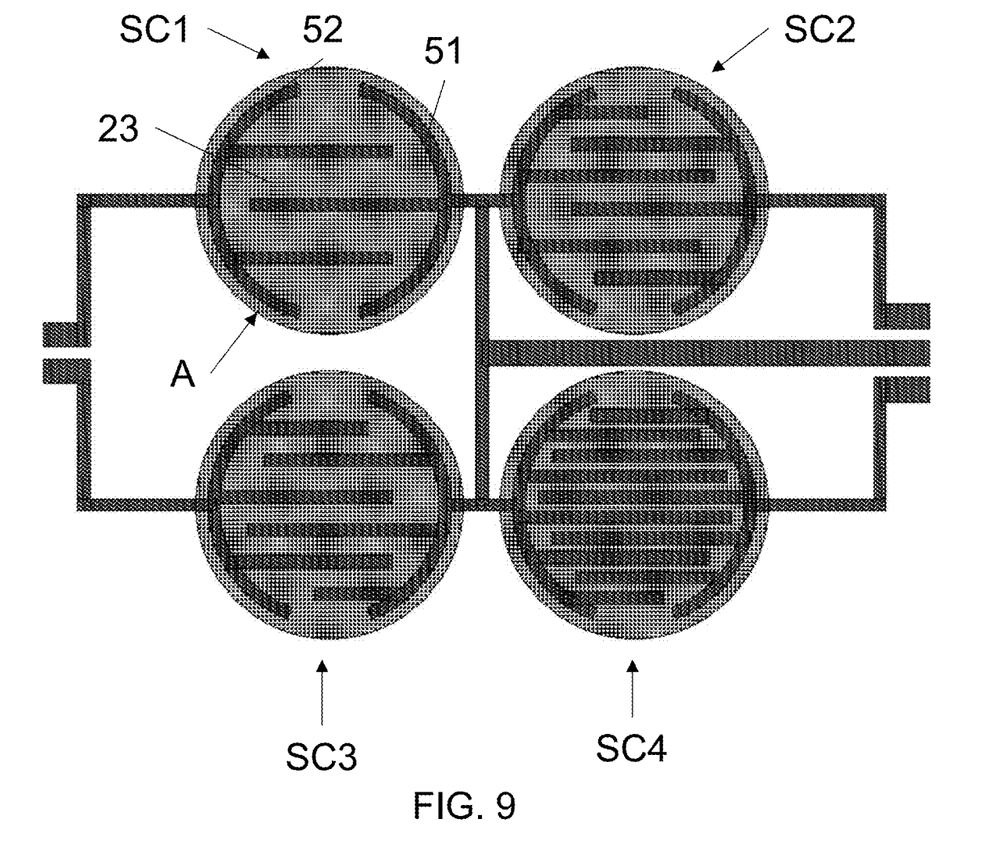

FIG. 9 illustrates a top view on a gas sensor according to another embodiment of the present invention. This gas sensor comprises four sensor cells SC1-SC4, each covering a circular maximal admissible coverage area A. The dark structures 51 and 52 denote an electrode pattern for contacting a sensitive film above. The various sensor cells SC1-SC4 may have a different layout of electrode pattern 51, 52.

The area of each sensor cell is covered by multiple individual posts 23. Each small rectangle shall denote a post 23. The posts 23 are assumed to be arranged on top of the electrode pattern 51, 52, i.e. in an upper level such that in this embodiment the electrodes themselves do not act as expansion inhibitors.

Figure 10:
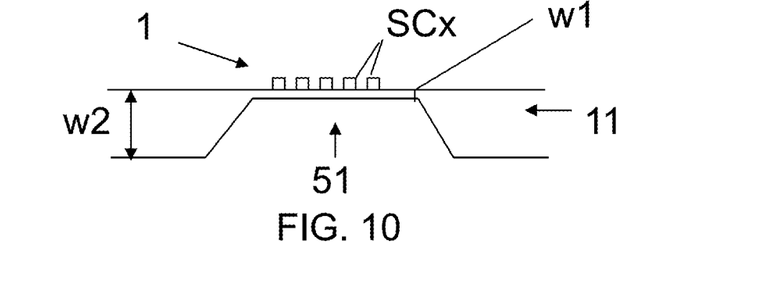

FIG. 10 shows a side cut of a gas sensor according to an embodiment of the present invention. Multiple sensor cells SCx are arranged on top of a substrate 1. The substrate 1 has a first thickness w1 in a first region and a second thickness w2 in a second region. The second thickness w2 represents a standard thickness of the substrate 5. In the first region where the sensor cells SCx reside, the substrate 1 is thinned to the first thickness w1. In case that the sensor cells SCx include metal oxide sensitive films, such metal oxide sensitive films may be heated prior to taking a reading. In view of an improved heat efficiency, the sensor cells SCx may be arranged in the first region of the substrate 1 with the smaller thickness w1. The first region with the small thickness w1 may be formed by forming a recess 51 into the backside of the substrate 5.

Figure 11:
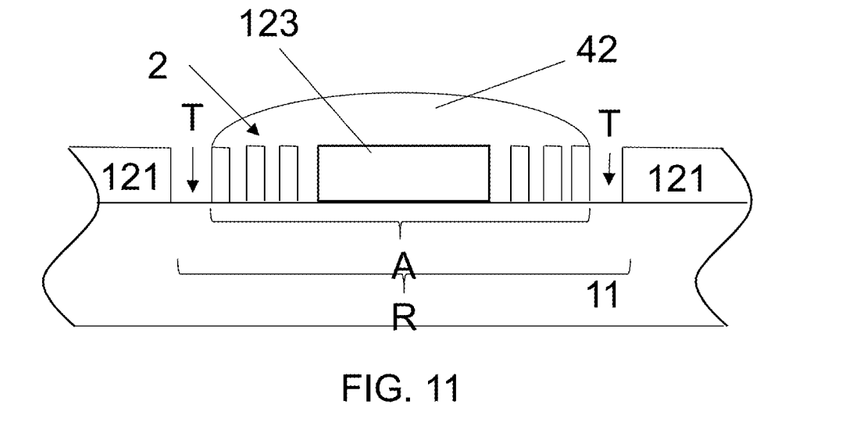

FIG. 11 illustrates a sectional view of a gas sensor according to another embodiment of the present invention, which gas sensor is very similar to the gas sensor of FIG. 1c). However, another rim 123 is built from the insulating layer within the maximal admissible coverage area A of the substrate, such that the elevated structures 2 may rather be perceived by the adjacent indentations. The sensitive material in this example is preferably dispensed onto the rim 123 while in the embodiment of FIG. 1c) the sensitive material is preferably dispensed to a different level, i.e. the level of the bulk material.

For all embodiments of the gas sensor, electronic circuitry may preferably be integrated in the subject substrate, specifically by using CMOS processes. Such electronic circuitry may include linearizing, compensating, evaluating, digitizing and/or other functionality.

While there are shown and described presently preferred embodiments of the invention, it is to be distinctly understood that the invention is not limited thereto but may be otherwise variously embodied and practised within the scope of the following claims.

The invention claimed is:

1. Gas sensor, comprising
   a set of one or more sensor cells each designed for detecting one or more chemical substances or compounds, and a substrate, wherein each sensor cell of the set comprises:
   a sensitive film built from a sensitive material covering a sensor cell area of the substrate, which material is sensitive to one or more of said chemical substances or compounds; and
   one or more elevated structures in or around said sensor cell area for preventing the sensitive material to expand when being applied to said sensor cell area, at least one of the elevated structures comprising a first side face facing the sensitive material when applied to the sensor cell area, a second side face averted from the first side face, and a top surface linking the first and the second side face, the sensitive material, which is sensitive to said one or more of said chemical substances or compounds, covering the first side face and the top surface and not covering the second side face, wherein an elevated structure is perceived as an elevation from a level of the substrate from which the elevated structure protrudes and to which level the sensitive material is deposited, and wherein each sensor cell as an entity of the gas sensor is read individually.

2. The gas sensor according to claim 1, wherein one or a number of or all of the elevated structures are made from an insulating coating of the substrate.

3. The gas sensor according to claim 2,
wherein each sensor cell of the set comprises an electrode pattern for measuring an ohmic resistance of the sensitive film,
wherein a number of the elevated structures made from the insulating coating is arranged outside a region covered by the electrode pattern.

4. The gas sensor according to claim 1, wherein one or a number of or all of the elevated structures are made from one of silicon nitride and silicon oxide.

5. The gas sensor according to claim 1, wherein the sensitive film emerges from a recess in the insulating coating, and wherein the sensitive film is separated by a trench from a rim of the insulating coating defining the recess.

6. The gas sensor according to claim 1, wherein one or a number of or all of the elevated structures are made from or covered by an electrically conducting material including metal.

7. The gas sensor according to claim 6, wherein one or more or all of the elevated structures made from or covered by the electrically conducting material are electrodes for measuring an ohmic resistance of the sensitive film.

8. The gas sensor according to claim 1, wherein each sensor cell of the set comprises:
an inner portion surrounded by an outer portion, wherein at least one of the elevated structures is arranged in the outer portion, and wherein at least another one of the elevated structures is arranged in the inner portion.

9. The gas sensor according to claim 1, wherein each sensor cell of the set comprises:
wherein at least one of the elevated structures is made from an insulating material,
wherein at least another one of the elevated structures is made from or covered by an electrically conducting material.

10. The gas sensor according to claim 9, wherein each sensor cell comprises an inner portion surrounded by an outer portion, and wherein the at least one of the elevated structures is arranged in the outer portion, and wherein the at least other one of the elevated structures is arranged in the inner portion.

11. The gas sensor according to claim 1, wherein each sensor cell of the set comprises more than two elevated structures.

12. The gas sensor according to claim 1, wherein each sensor cell of the set comprises at least three elevated structures in form of a ring each, and wherein the multiple rings are of different size each and are arranged within each other.

13. The gas sensor according to claim 1, wherein each sensor cell of the set comprises a set of more than ten elevated structures.

14. The gas sensor according to claim 1, wherein a footprint of an elevated structure amongst the elevated structures is less than 5 µm×5 µm, and in particular is less than 1 µm×1 µm.

15. The gas sensor according to claim 1, wherein each elevated structure amongst the elevated structures has a form of one of: a pillar, a post, a prism.

16. The gas sensor according to claim 1, wherein a footprint of each elevated structure amongst the elevated structures is of one of: an oval, a circle, a rectangle, a square, a triangle.

17. A gas sensor configured to detect chemical substances or compounds, the gas sensor comprising:
a substrate; and
a set of sensor cells each configured for detecting one or more chemical substances or compounds, and each of the sensor cells of the set comprising:
a sensitive film constituted of a sensitive material sensitive to one or more of said chemical substances or compounds; and
plural elevated structures in or around a sensor cell area on the substrate, the elevated structures being configured to prevent the sensitive material to expand beyond said sensor cell area when the sensitive material is being applied to said sensor cell area,
the sensitive material covering the sensor cell area on the substrate, including covering (i) a top surface of each of the plural elevated structures disposed in or around the sensor cell area and (ii) portions of the sensor cell area between the plural elevated structures.

18. The gas sensor according to claim 17, further comprising:
a rim formed of an insulating material and disposed on the substrate to surround the plural elevated structures, the rim being separated from the plural elevated structures and the sensitive material by a trench circumscribing the sensor cell area and the plural elevated structures, the trench not extending below any of the plural elevated structures.

19. The gas sensor according to claim 17, wherein for each elevated structure amongst the plural elevated structures where (a1) a first side face of the elevated structure faces one or more other elevated structures amongst the plural elevated structures, and (a2) a second side face that is averted from the first side face does not face any other of the plural elevated structures, with the top surface of the elevated structure linking the first and second side faces of the elevated structure, the sensitive material (b1) covers the top surface and the first side face that faces said one or more other elevated structures and (b2) does not cover the second side face that does not face any other of the plural elevated structures.

20. A gas sensor configured to detect chemical substances or compounds, the gas sensor comprising:
a substrate; and
a set of sensor cells each configured for detecting one or more chemical substances or compounds,
at least one sensor cell amongst the sensor cells of the set comprising
a sensitive film constituted of a sensitive material sensitive to one or more of said chemical substances or compounds, and
plural elevated structures in or around a sensor cell area on the substrate, the plural elevated structures being configured to prevent the sensitive material to expand beyond said sensor cell area when the sensitive material is being applied to said sensor cell area,
wherein one or more elevated structures amongst the plural elevated structures of the sensor cell are arranged on the substrate to define a ring corresponding to a perimeter of the sensor cell area.

21. The gas sensor according to claim 20, wherein
the sensitive material covers the sensor cell area on the substrate, including (i) covering a top surface of each of the one or more elevated structures defining the ring corresponding to the perimeter of the sensor cell area, and (ii) covering portions of the sensor cell area between the plural elevated structures, and
the sensitive material does not cover a trench-facing side face of the one or more elevated structures defining the ring corresponding to the perimeter of the sensor cell area.

22. The gas sensor according to claim 20 further comprising:
a rim formed of an insulating material and disposed on the substrate, the rim surrounding the ring defined by the one or more elevated structures arranged on the substrate, the rim being separated from the sensitive material and said one or more elevated structures defining the ring corresponding to the perimeter of the sensor cell area, by a trench circumscribing said perimeter of the sensor cell area, the trench not extending below any of the one or more elevated structures arranged on the substrate to define the ring corresponding to the perimeter of the sensor cell area.

* * * * *